(12) United States Patent
Ahn et al.

(10) Patent No.: US 8,145,497 B2
(45) Date of Patent: Mar. 27, 2012

(54) MEDIA INTERFACE FOR CONVERTING VOICE TO TEXT

(75) Inventors: Tae Hee Ahn, Ohsan-si (KR); Sung Hun Kim, Hwasung-si (KR); Dong Hoon Lee, Seould (KR)

(73) Assignee: LG Electronics Inc., Seoul (KR)

( * ) Notice: Subject to any disclaimer, the term of this patent is extended or adjusted under 35 U.S.C. 154(b) by 834 days.

(21) Appl. No.: 12/216,815

(22) Filed: Jul. 10, 2008

(65) Prior Publication Data

US 2009/0018838 A1    Jan. 15, 2009

(30) Foreign Application Priority Data

Jul. 11, 2007    (KR) .................. 10-2007-0069854

(51) Int. Cl.
  *G10L 11/00*    (2006.01)
(52) U.S. Cl. .................. 704/278; 704/260; 704/269
(58) Field of Classification Search .................. 704/260, 704/278, 269
  See application file for complete search history.

(56) References Cited

U.S. PATENT DOCUMENTS

| 5,630,017 | A | | 5/1997 | Gasper et al. |
|---|---|---|---|---|
| 5,798,752 | A | * | 8/1998 | Buxton et al. ................. 715/863 |
| 7,433,822 | B2 | * | 10/2008 | Buchholz et al. ............. 704/270 |
| 2002/0178007 | A1 | * | 11/2002 | Slotznick et al. .......... 704/270.1 |
| 2003/0023442 | A1 | | 1/2003 | Akabane et al. |
| 2003/0023443 | A1 | | 1/2003 | Shizuka et al. |
| 2004/0215451 | A1 | | 10/2004 | Macleod |

FOREIGN PATENT DOCUMENTS

EP    1 083 536 A2    3/2001

* cited by examiner

*Primary Examiner* — Vincent P Harper
(74) *Attorney, Agent, or Firm* — Birch, Stewart, Kolasch & Birch, LLP

(57) ABSTRACT

Provided are a user interface for processing digital data, a method for processing a media interface, and a recording medium thereof. The user interface is used for converting a selected script into voice to generate digital data having a form of a voice file corresponding to the script, or for managing the generated digital data. In the method, the user interface is displayed. The user interface includes at least a text window on which a script to be converted into voice is written, and an icon to be selected for converting the script written on the text window into voice.

17 Claims, 13 Drawing Sheets

MEDIA INTERFACE FOR CONVERTING VOICE TO TEXT

CROSS-REFERENCE TO RELATED APPLICATIONS

The present application claims priority under 35 U.S.C. 119 and 35 U.S.C. 365 to Korean Patent Application No. 10-2007-0069854 (filed on Jul. 11, 2007), which is hereby incorporated by reference in its entirety.

BACKGROUND

The present disclosure relates to an interface for generating and using digital contents.

Digital contents of various forms such as moving image files, image files, voice files, and text files are provided. A variety of applications and apparatuses are provided for generation, conversion, reproduction, transmission, movement, and management of digital contents. The generation of digital contents can be understood as concept including processing and converting. New digital contents can be generated by processing digital contents and converting the digital contents into the new digital contents. Therefore, an application for generating and using digital contents, and technological means for generating, reproducing, transmitting, moving, and managing the digital contents on the basis of an interface between a user and an apparatus, are required.

SUMMARY

Embodiments provide a media interface for converting text type digital contents into voice data to generate a voice file.

Embodiments also provide a media interface for converting a script selected by a user into a voice file, and storing, reproducing, or transmitting the converted voice file.

Embodiments also provide a media interface for converting a script selected by a user into a voice file according to a conversion condition set by the user, and storing, reproducing, or transmitting the converted voice file.

In one embodiment, a method for processing a media interface includes displaying a user interface screen including at least a text window on which a script to be converted into voice is written, and an icon to be selected for converting the script written on the text window into voice.

In another embodiment, a method for processing a media interface includes: displaying a user interface screen including at least a text window on which a script to be converted into voice is written; and displaying a user interface screen including an icon determining a condition for converting the script written on the text window into voice, and determining whether to convert the script.

In further another embodiment, a recording medium having a media interface application recorded thereon, the application being processed using a method including: displaying a user interface window including a text-to-speech conversion item; when the text-to-speech conversion item is selected, displaying a user interface window including a text window on which a script to be converted is written, and icons for selecting a kind of conversion; when one of the icons for selecting the kind of conversion is selected, displaying a user interface window for converting a script into voice according to the kind of corresponding conversion, an icon for selecting whether to reproduce converted voice signals or convert the script into a voice file being included in at least one of operations of displaying the user interface window.

In still further another embodiment, a method for processing a media interface includes: displaying a user interface screen including a list of files that have been converted into voice from a script; and displaying a user interface screen including at least one of a text window on which a script to be converted is written, a kind of conversion, and execution of conversion.

In still further another embodiment, a method for processing a media interface includes: displaying a user interface screen including a list of voice files that have been converted into voice from a script and an icon for reproducing a voice file selected from the displayed list of the voice files.

According to embodiments, there is provided a recording medium having an application recorded thereon, the application processing a media interface using the method for processing the media interface.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings. A case where a user directly generates a desired voice file with respect to a script will be described as an embodiment. The voice file can be understood as user generated contents (UGC) in view of an aspect that the user directly generates the voice file, i.e., digital contents. The term "UGC", which will be described in the embodiment, is a mere example for easy understanding, and the embodiment is not limited thereto.

Figure 1:
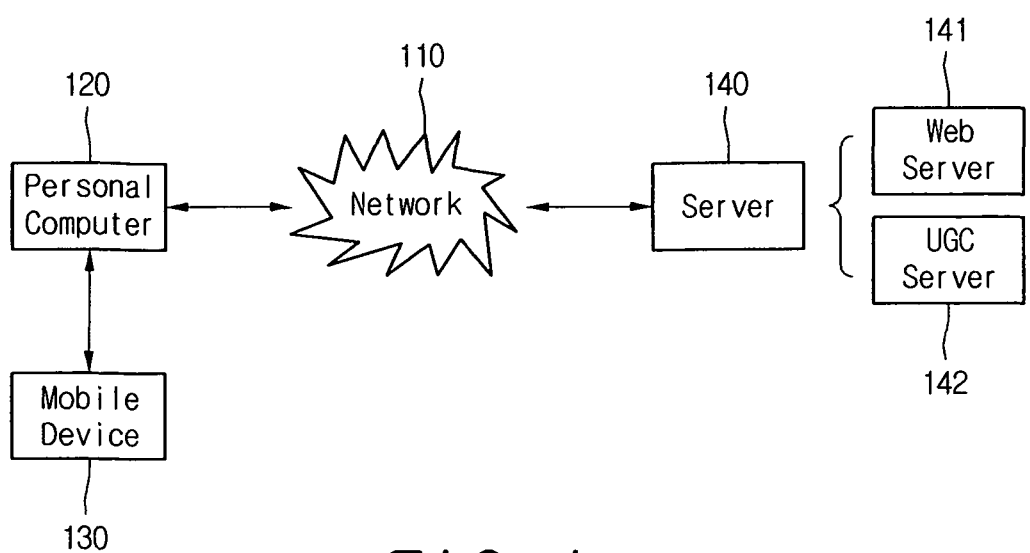
FIG. 1 is a view illustrating a system for processing digital contents according to an embodiment.

Referring to FIG. 1, a system for processing digital contents according to an embodiment includes a network 110, a personal computer 120, a mobile device 130, and a server 140. The network 110 is a wired communication network or a wireless communication network, and can be the Internet for example. The server 140 and terminals are connected with each other via the network 110. Here, examples of the terminals include the personal computer 120 and the mobile device 130. The server 140 is divided into a web server 141 and a UGC server 142. A text-to-speech (TTS) application for converting text data into voice data is provided. TTS application is described as a TTS engine. The TTS engine that converts text data into voice data is provided to at least one of the server 140, the personal computer 120, and the mobile device 130. In the case where the server 140 is divided into the web server 141 and the UGC server 142, the TTS engine can be provided to the UGC server 142. Text data to be converted is selected as a script form by a user using the personal computer 120 or the mobile device 130. The selected script is converted into voice data by the personal computer 120, the mobile device 130, or the UGC server 142 having the TTS engine, and provided as a voice file. Here, the voice file is stored in the personal computer 120, the mobile device 130, or the UGC server 142, or can be transmitted to a counterpart user via the network 110. The personal computer 120 is connected with the mobile device 130 using a communication device. Transmission and reception of a generated voice file can be performed between the personal computer 120 and the mobile device 130.

The mobile device 130 can be one of a personal digital assistant (PDA), a pocket personal computer (PC), a hand held PC (HPC), a web pad, a notebook, and an E-book terminal. As a data processing device that can be used by a user while moving, the mobile device 130 generally has a function of reproducing multimedia including images and voices. A predetermined script is one of a user generated script and a script on a web page provided from the web server connected to the Internet. An entire script of the web page is selected or a script existing inside a region designated by the user is selected.

The mobile device 130 or the PC 120 includes an application for processing a media interface according to an embodiment, and stores or installs a media reproducing application therein. The UGC server 142 uploads or downloads user produced contents requested by the mobile device 130 or the PC 120 connected via the network 110. The web server 141 stores a variety of contents such as voices, images, and text (script), and provides contents corresponding to a request from the mobile device 130, the PC 120, or the UGC server 142 to a relevant device. Generation of a voice file corresponding to a script selected by the user is performed by the TTS engine provided to the PC 120, or can be performed by the TTS engine provided to the UGC server 142 according to other embodiment. Also, generation of a voice file corresponding to a script selected by the user can be performed by the UGC server 142 according to input of a menu item provided by a browser for a UGC server only, installed in the PC 120.

Figure 2:
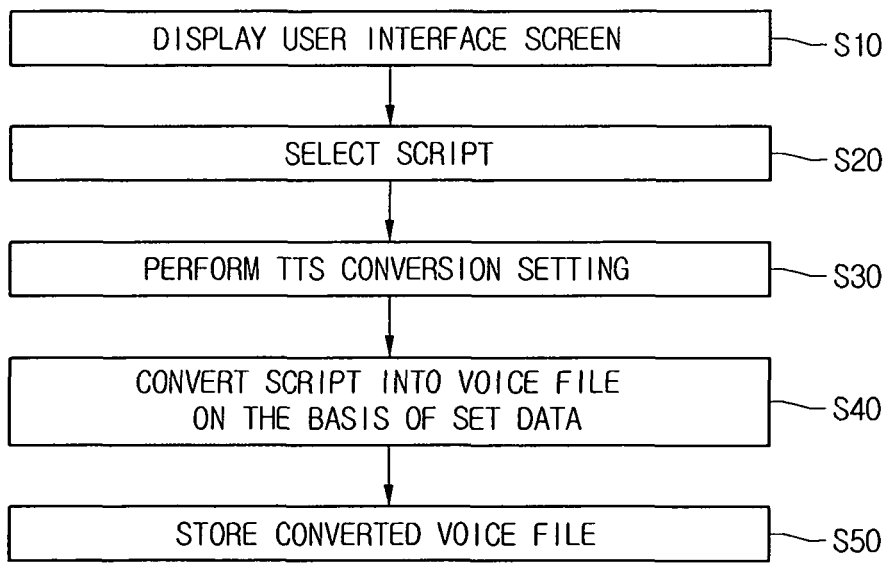
FIG. 2 is a view illustrating a method for processing digital contents according to an embodiment.

FIG. 2 illustrates a method for processing digital contents according to an embodiment. When the application mounted in the mobile device 130 or the PC 120 is executed, a user interface screen is displayed on a display unit of the device (S10). A user selects a script through the displayed user interface screen (S20). A condition of TTS conversion is set on the selected script (S30). The setting of the TTS conversion condition can be performed before the selection of the script. Also, a conversion condition can be set by default. The set condition can be stored, and a script can be converted into a voice file using the TTS engine according to the set condition. In this case, since the setting of the TTS conversion condition has been performed in advance, substantial performing of an operation S30 can be omitted. A voice file is generated by converting a corresponding script into voice data using the TTS engine on the basis of the selection of a script and the setting of conversion condition (S40). The generated voice file is stored in a storage unit of the device (S50). A storing operation S50 can be omitted depending on an embodiment. Though not shown in FIG. 2, a converted or stored voice file can be transmitted to other device.

Figure 3:
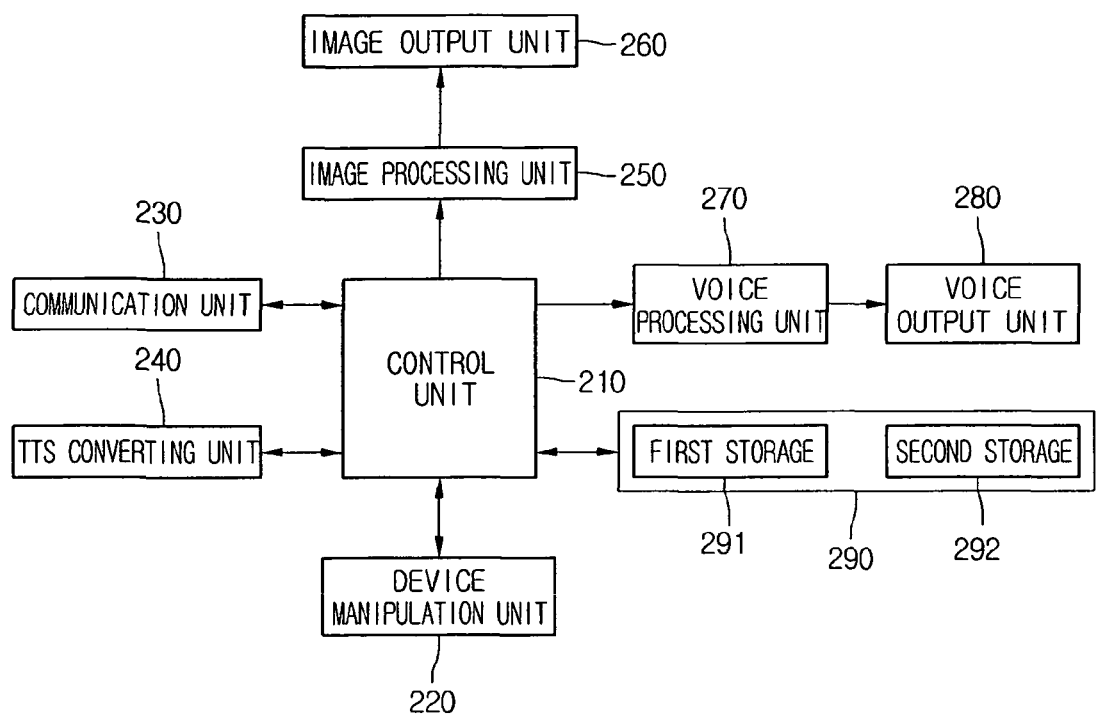
FIG. 3 is a view illustrating an apparatus for processing digital contents according to an embodiment.

FIG. 3 illustrates the construction of a mobile device according to an embodiment. Here, though description is made for the case where media interface processing is performed at the mobile device, media interface processing, which will be described later, can be performed likewise at the PC 120 or the UGC server 142. Referring to FIG. 3, the mobile device includes a control unit 210, a device manipulation unit 220, a communication unit 230, a TTS converting unit 240, an image processing unit 250, an image output unit 260, a voice processing unit 270, a voice output unit 280, and a storage unit 290.

The control unit 210 controls execution of an application, storage, conversion, transmission, reception of data, voice processing and outputting, and image processing and outputting. The device manipulation unit 220 can be a keypad or a touch pad type input unit, for example. The communication unit 230 performs wireless communication or wired communication. The TTS converting unit 240 converts text into voice data. The image processing unit 250 processes image signals to be displayed. The image output unit 260 can be an image display unit, and outputs a user interface screen of various structures, which will be described later, for media interface processing. The voice processing unit 270 processes voice signals to be output. The voice output unit 280 can be a speaker. The storage unit 290 includes a first storage 291 storing application for operating the mobile device, and a second storage 292 storing contents. Here, the application includes an application for media interface processing, and can further include an application for reproducing media. The first storage 291 and the second storage 292 are divided for easy understanding, and can be substantially incorporated into one storage medium. Different storage media can be used if necessary. A relevant application is executed on a display screen generated every operation according to a user's command input through the device manipulation unit 220, and displayed on the image output unit 260 through the image processing unit 250.

Figure 4:
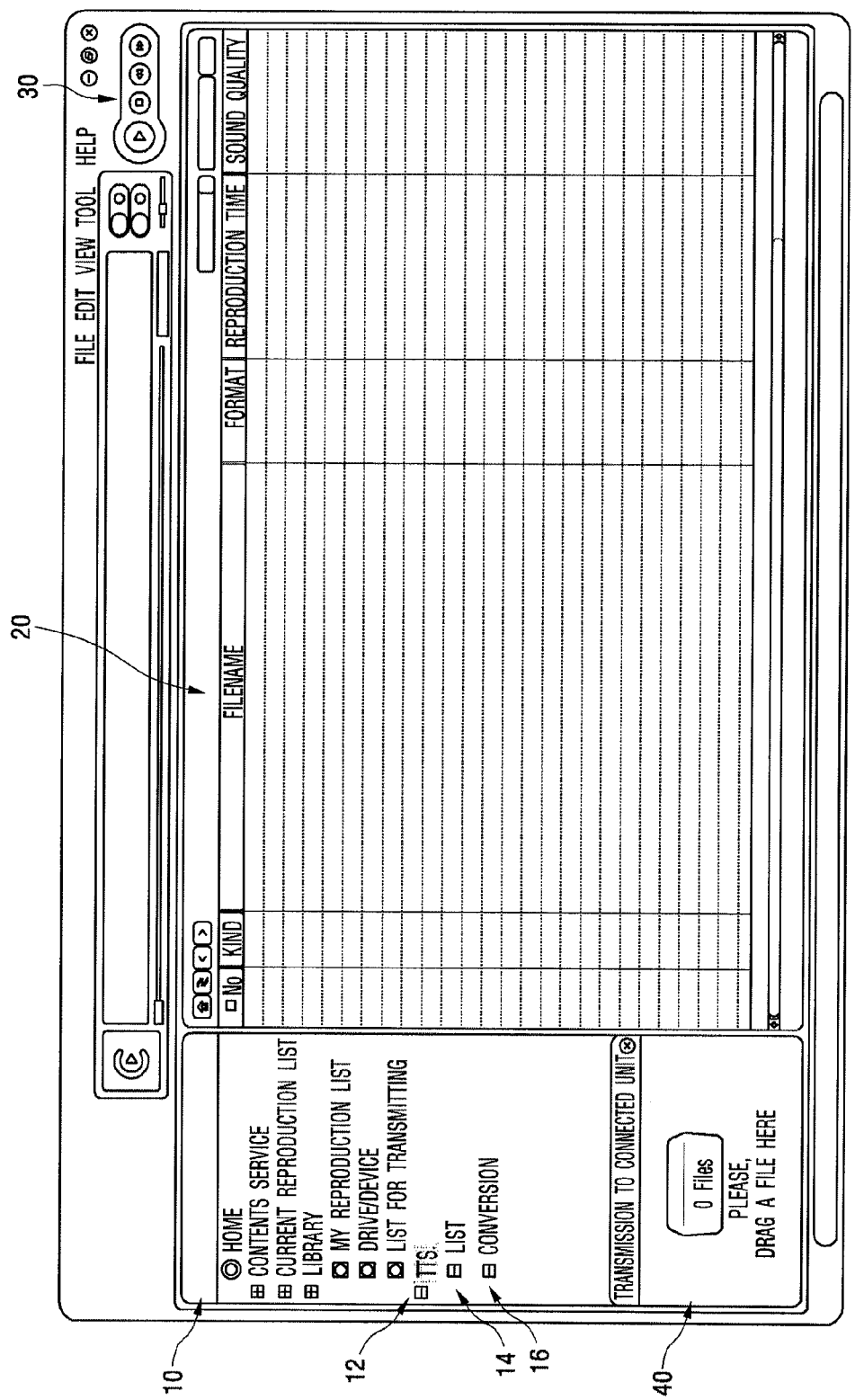
FIGS. 4 to 14 are views illustrating an example of an interface screen according to an embodiment.

FIG. 4 illustrates an example of a user interface screen according to an embodiment. This is a mere example for easy understanding, and embodiments are not limited to the structure described herein.

The control unit 210 executes a media interface application of the first storage 291, generates a user interface screen of a structure shown in FIG. 4, and displays the user interface screen on the image output unit 260 through the image processing unit 250 according to a user's command input from the device manipulation unit 220.

The user interface screen includes a structure window 10, a file list window 20, a control icon window 30, and a transmission control icon window 40. The structure window 10 expresses a variety of menu items, and data regarding a media storing structure that can be dealt with by the media interface application. The structure window 10 includes a TTS item 12. The TTS item 12 includes a list item 14 and a conversion item 16. When the TTS item 12 is selected, the file list window 20 is displayed. In an embodiment, the file list window 20 can express No. of voice files, a kind, a filename, a format, a reproduction time, and sound quality of a voice file. No. of voice files is the number of voice files. The kind can express a condition set when a script is converted into a voice file. That is, the kind can express on which condition a voice file has been generated.

The filename shows a name of a voice file. The format expresses which format a voice file has. The format can express a voice file having an mp3 format. The reproduction time expresses the reproduction time of a voice file. The sound quality expresses encoding sound quality of a voice file. The control icon window 30 expresses icons regarding reproduction, stop, pause, and searching of a selected voice file. The transmission control icon window 40 is designed for transmitting a selected voice file to a unit connected to a device.

Figure 5:
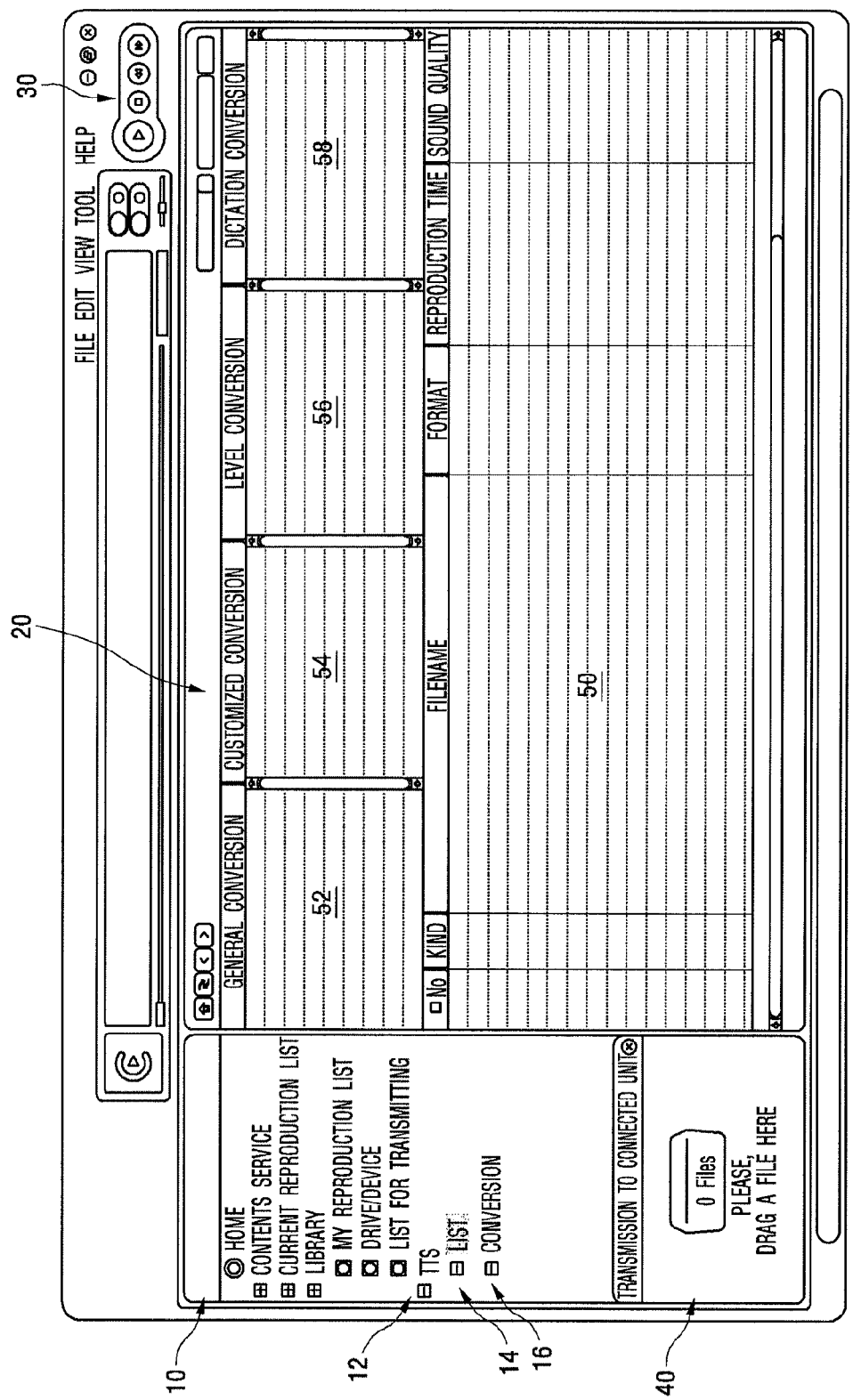

FIG. 5 illustrates an example of an interface screen displayed when a list 14, which is a submenu item of the TTS item 12, is selected. This is a mere example for easy understanding, and embodiments are not limited to the structure described herein. In an embodiment, voice files generated on the basis of a TTS can be classified into several types of voice files. In an embodiment, generation of a voice file can have a general conversion mode, a customized conversion mode, a level conversion mode, and a dictation conversion mode. Selection of the conversion mode is set in advance on the basis of a user interface. The TTS engine converts a script into a voice data file suitable for a set conversion mode using the set results.

In the general conversion mode, a script is directly converted into voice. In the customized conversion mode, a user sets a section to be converted, a speed, and an interval within a script in person to convert the script into voice. In the level conversion mode, voice conversion is performed on the basis of a user's registered level. In the dictation conversion mode, after one sentence within a script is converted, a predetermined set time is paused, and then a next sentence is converted, so that a voice file is generated. This case is expressed as the dictation conversion mode in that a sentence can be written during a pause. The dictation conversion mode can be applied as a follow conversion. That is, after voice reproduction of one sentence is performed, a user can follow the sentence during a pause, so that the user can learn the process. In an embodiment, in the case where a voice file is generated by the customized conversion mode, a corresponding script can be also generated in the same format as that determined by the user and displayed. For example, when a section repeat is set to a script or a text within the script, a corresponding voice file is repeated and simultaneously the text corresponding to the section repeat set portion is also repeatedly displayed.

The selection of the list 14 is performed by the device manipulation unit 120. The control unit 210 generates and displays the interface screen of FIG. 5 on the image output unit 260 through the image processing unit 250. When the list 14 is selected, a file list window 50 and list windows 52, 54, 56, and 58 for each conversion mode depending on a conversion condition are displayed.

In an embodiment, list windows for each conversion mode express four conversion kinds of a general conversion mode, a customized conversion mode, a level conversion mode, and a dictation conversion mode. According to an embodiment, in the general conversion mode, a selected script is directly converted into a voice file without other conditions. According to an embodiment, in the customized conversion mode, a user applies various conditions, which will be described later, to a selected script to edit the script in person, thereby converting the script into a voice file. In an embodiment, the level conversion mode can be usefully used for learning a foreign language. In the level conversion mode, a generation condition of a voice file is set for each language learning level, and a script is converted into a voice file according to this condition. In an embodiment, in the dictation conversion mode, a selected script is converted into a voice file with a pause provided by a sentence unit. The dictation conversion mode can be understood as a follow conversion mode. The dictation conversion mode can be usefully used for learning a foreign language. Since one sentence is reproduced and then a pause is provided when a voice file is reproduced, a user can write down the sentence during this pause or pronounce the sentence during this pause to learn a foreign language.

Figure 6:
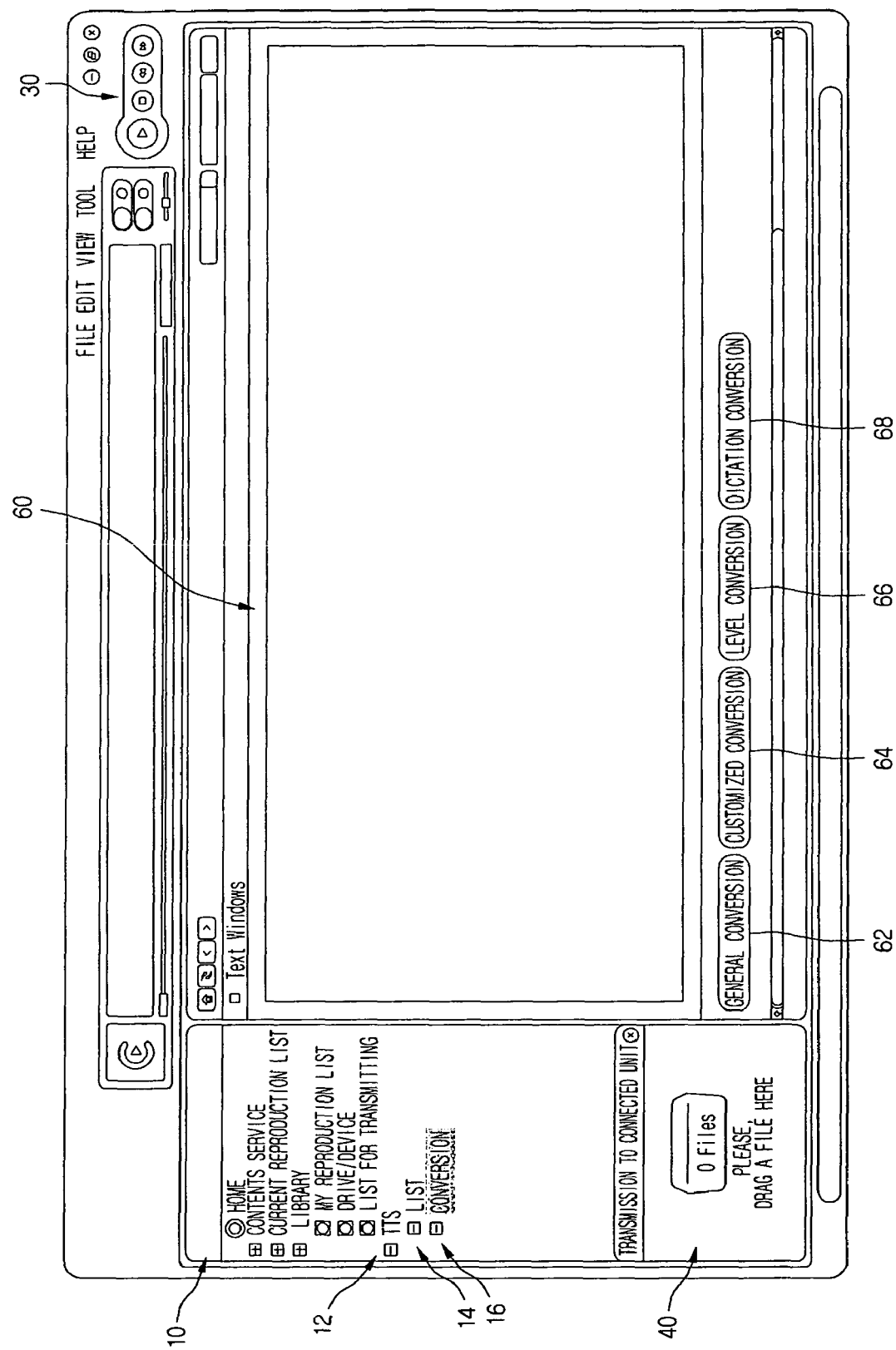

FIG. 6 illustrates an example of an interface screen displayed when the conversion 16, which is a submenu item of the TTS item 12, is selected. This is a mere example for easy understanding, and embodiments are not limited to the structure described herein. The selection of the conversion 16 is performed by the device manipulation unit 120. The control unit 210 generates and displays the interface screen of FIG. 6 on the image output unit 260 through the image processing unit 250. When the conversion 16 is selected, a text window 60, a general conversion menu item 62 for selecting the kind of conversion, a customized conversion menu item 64, a level conversion menu item 66, and a dictation conversion menu item 68 are displayed. Text data to be generated as a voice file on the basis of TTS conversion is recorded on the text window 60. The text data is recorded in a script type. For example, a predetermined script of a web server 141 connected to the Internet via the communication unit 230 can be selected and recorded on the text window 60. Also, the user can write down text in person using the device manipulation unit 220.

Figure 7:
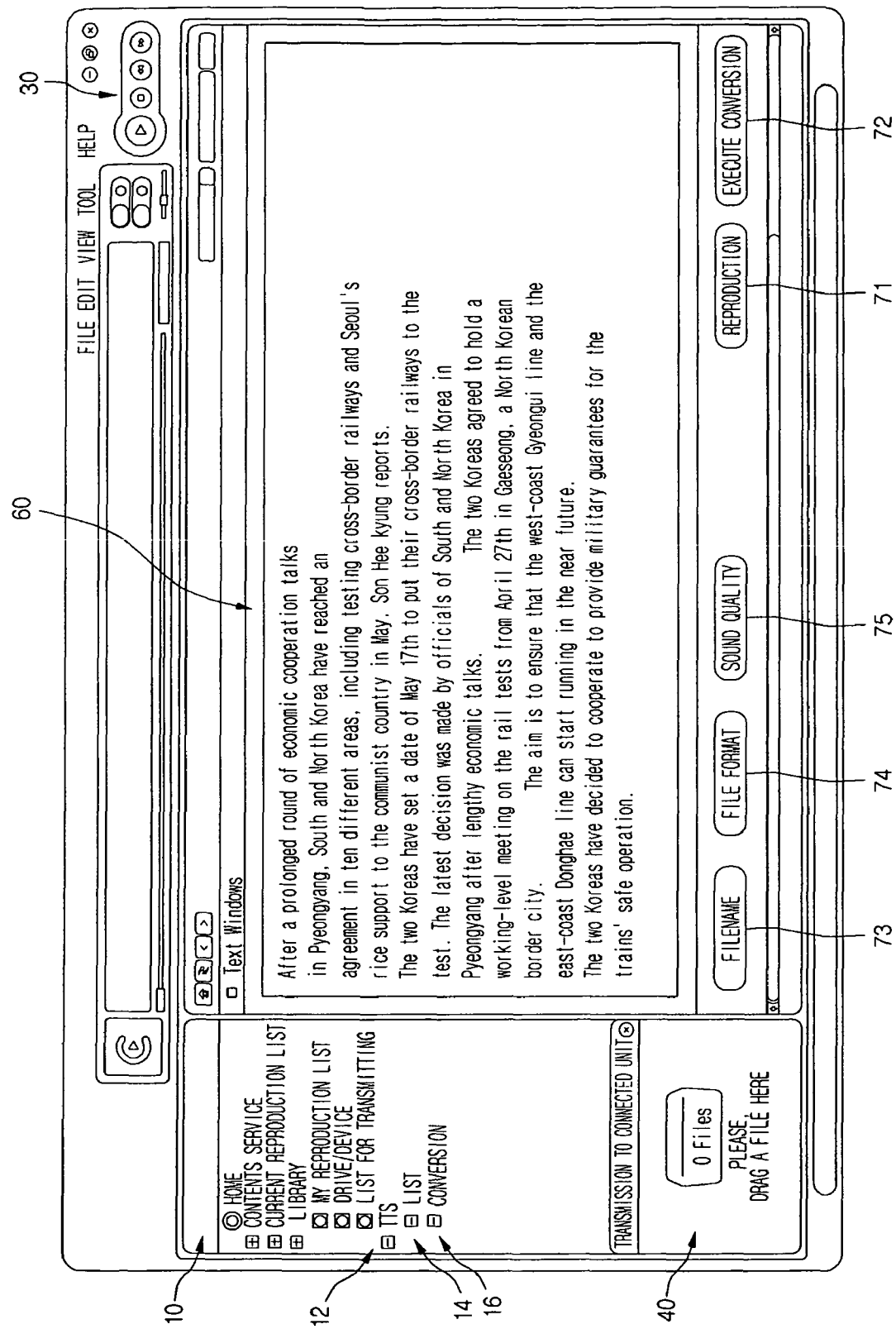

FIG. 7 illustrates an example of an interface screen displayed when the general menu item 62 is selected. This is a mere example for easy understanding, and embodiments are not limited to the structure described herein. The selection of the general menu item 62 is performed by the device manipulation unit 120. The control unit 210 generates and displays the interface screen of FIG. 7 on the image output unit 260 through the image processing unit 250. A script selected by the user is recorded on the text window 60. The recorded text is converted into voice data and reproduced, or stored in a voice file. For this purpose, a reproduction menu item 71 and a conversion execution menu item 72 are displayed. The text recorded on the text window 60 is converted into voice data by the TTS converting unit 240 under control of the control unit 210.

When the reproduction menu item 71 is selected, the control unit 210 converts converted voice data into analog signals using the voice processing unit 270, and outputs the analog signals through the voice output unit 280. When the conversion execution menu item 72 is selected, the control unit 210 converts text of a selected script into a voice file using the TTS converting unit 240. The converted voice file is stored in the second storage 292, or can be transmitted to other apparatus through the communication unit 230. The transmission of the converted voice file can be performed using the transmission control icon window 40, which will be described later. In an embodiment, a filename menu item 73, a file format menu item 74, and a sound quality menu item 75 can be provided. The filename menu item 73 is designed for giving a filename in the case where a selected script is converted into a voice file, and the file format menu item 74 is designed for setting a file format as a condition for conversion in the case where a selected script is converted into a voice file. The sound quality menu item 75 is designed for setting sound quality.

When the filename menu item 73 is selected, a filename input window is displayed, and the control unit 210 stores the corresponding voice file in the second storage 292 in the filename input through the device manipulation unit 220. A default filename can be automatically given as the filename according to a predetermined condition set in advance depending on cases. When the file format menu item 74 is selected, a format list window containing supportable voice file formats is displayed, and the control unit 210 converts a script into a voice file having a format selected through the device manipulation unit 220. When the sound quality menu item 75 is selected, a list window of supportable encoding bit rates is displayed, and the control unit 220 converts a script into a voice file having sound quality selected through the device manipulation unit 220. In an embodiment, conditions such as a file format and sound quality can be set in advance. These conditions can be changed during the general conversion mode. The set data are stored. In the case where the user desires reproduction without separate file conversion, when the menu item 71 is selected by the user, a script is directly converted into voice and reproduced without file conversion.

Figure 8:
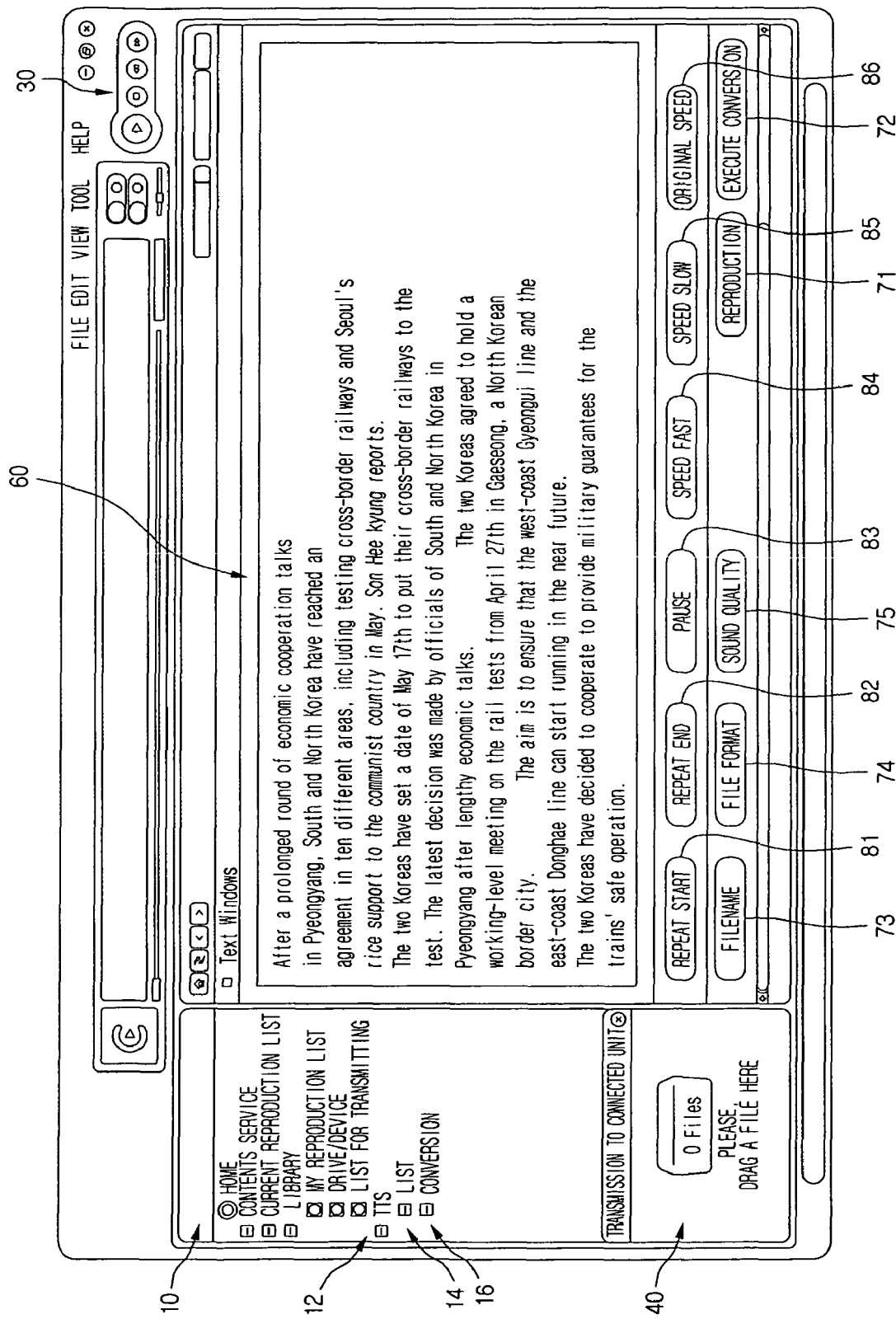

FIG. 8 illustrates an example of an interface screen displayed when the customized conversion menu item 64 is selected. This is a mere example for easy understanding, and embodiments are not limited to the structure described herein. The selection of the customized conversion menu item 64 is performed by the device manipulation unit 120. The control unit 210 generates and displays the interface screen of FIG. 8 on the image output unit 260 through the image processing unit 250. A script selected by the user is recorded on the text window 60. A reproduction menu item 71, a conversion execution menu item 72, a filename menu item 73, a file format menu item 74, and a sound quality menu item 75 are the same as those of FIG. 7.

Menu items for setting conversion conditions to generate a voice file according to a predetermined condition set by a user are provided. The menu items for setting the conversion conditions described herein are mere examples for easy understanding. A repeat start menu item 81 and a repeat end menu item 82 allow a predetermined section of a script to be repeated. The number of repetitions can be set by the user. A pause menu item 83 suspends outputting of a voice signal at the next turn for a set time period at a predetermined position of a script. A pause time can be set by the user. A speed fast menu item 84 makes a script reading speed fast. A speed slow menu item 85 makes a script reading speed slow. An original speed menu item 86 is used to stop speed change.

Figure 9:
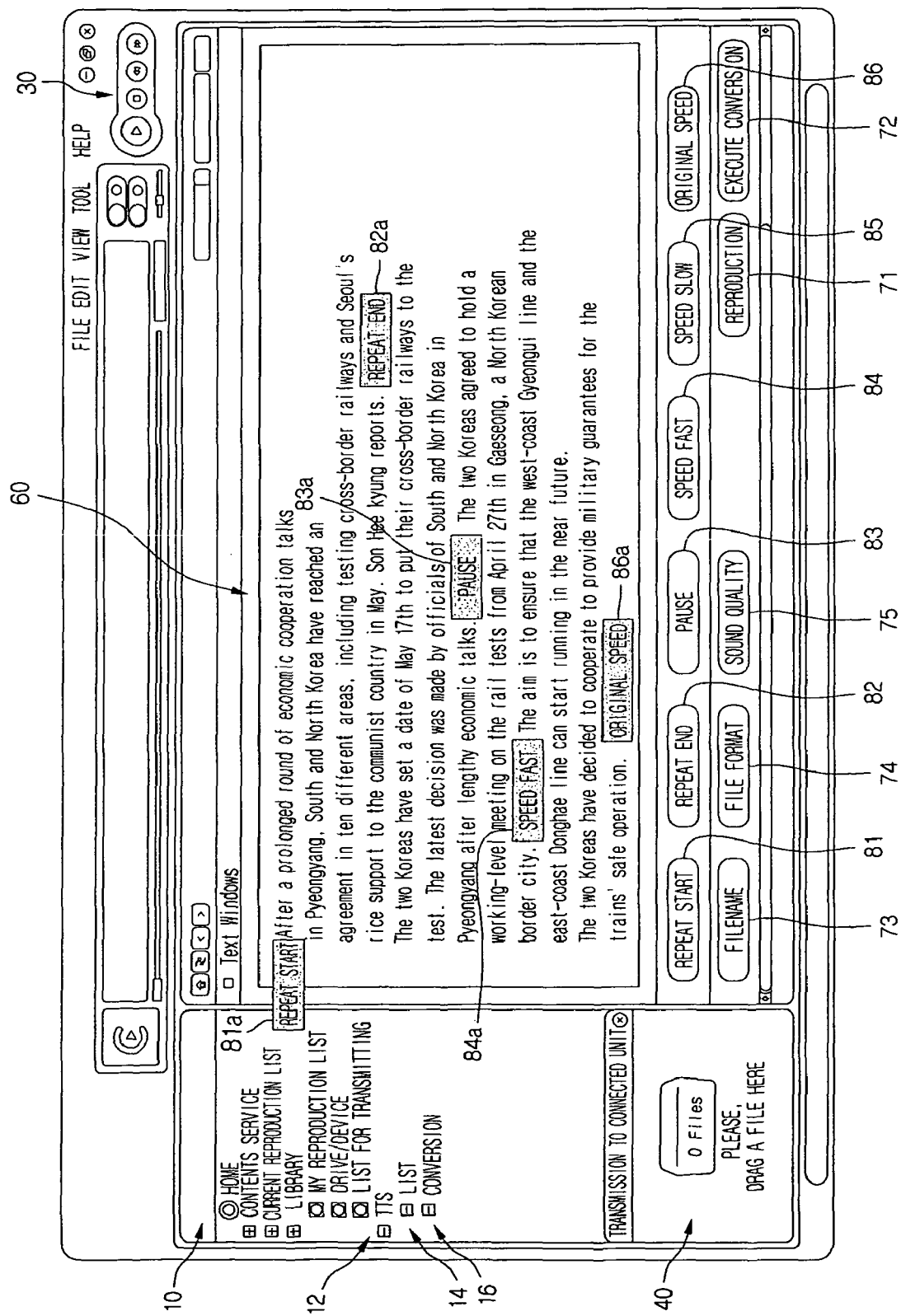

FIG. 9 illustrates an example of an interface screen where various conversion conditions are set to a script upon the customized conversion. This is a mere example for easy understanding, and embodiments are not limited to the structure described herein. A conversion condition is set by dragging one menu icon of various menu icons 81 to 86 for setting conversion conditions to a predetermined position on a script.

A repeat start icon 81a is located on the beginning of a sentence. A repeat end icon 82a is located on the ending of the sentence. Assuming that the number of repetitions is set to one time, a script is generated in such a manner that a voice signal is repeated one time from a position where the repeat start icon 81a is located to a position where the repeat end icon 82a is located. A position where a pause icon 83a is located is processed as a mute section where a voice signal is not present for a set time period. Voice signals are generated at a section from a position where a speed fast icon 84a is located to a position where an original speed icon 86a is located in such a manner that a reading operation is performed at a faster speed than that of other sections.

Figure 10:
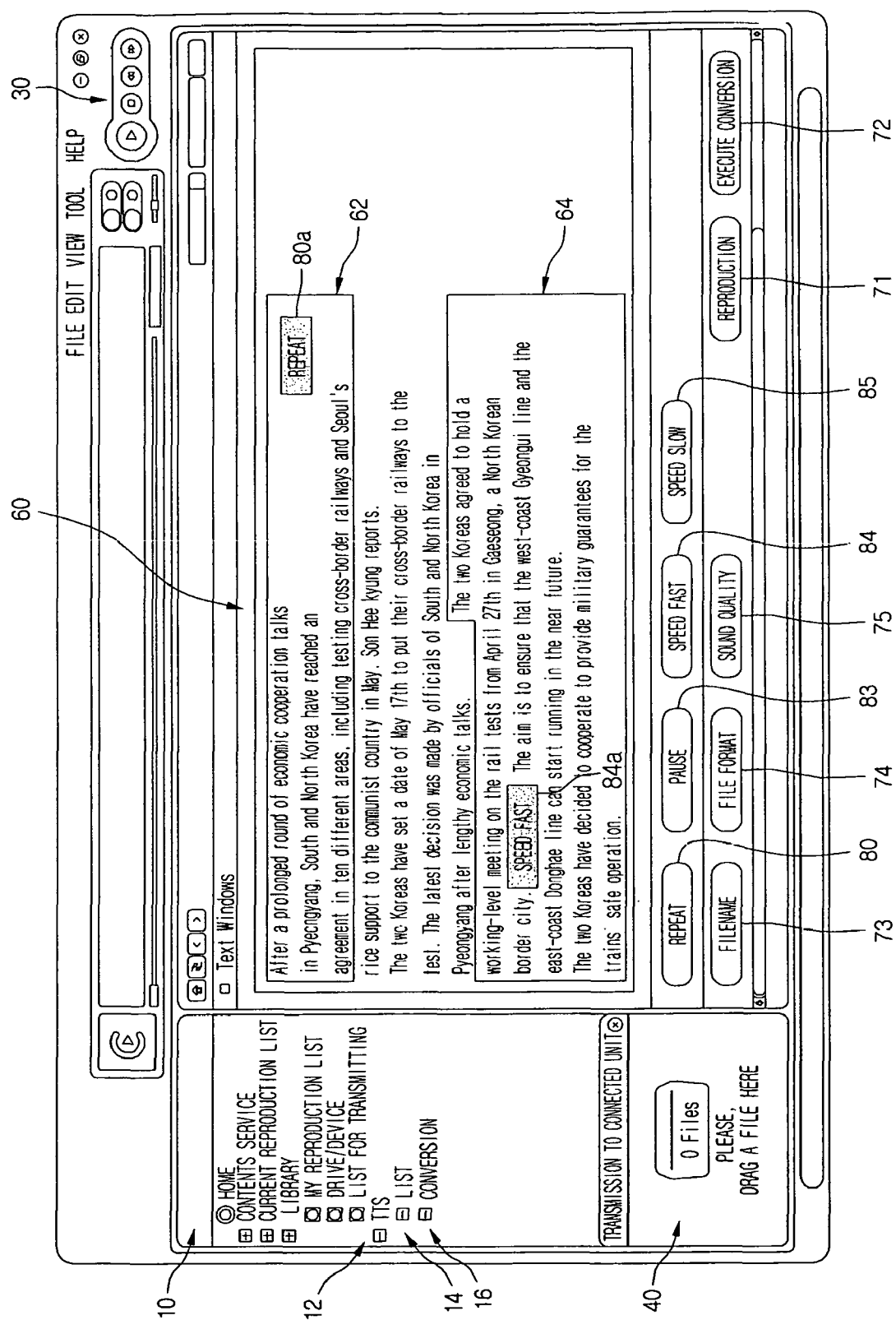

FIG. 10 illustrates another example of an interface screen where various conversion conditions are set upon the customized conversion. This is a mere example for easy understanding, and embodiments are not limited to the structure described herein. In this case, a sentence 62 a user desires to repeat is selected as a block through a dragging operation on the first place. Next, when a relevant icon is dragged to the selected sentence, a repeat icon 80a is set to the selected sentence. The speed fast icon 84a and a speed slow icon are used in the same manner as the repeat icon 80a. FIG. 10 exemplarily illustrates the speed fast icon 84a is set to the selected sentence 64. The pause icon is used in the same manner as in FIG. 9.

FIGS. 8 to 10, the number of repetitions can be set to once, twice, and three times depending on clicking of a corresponding icon.

Figure 11:
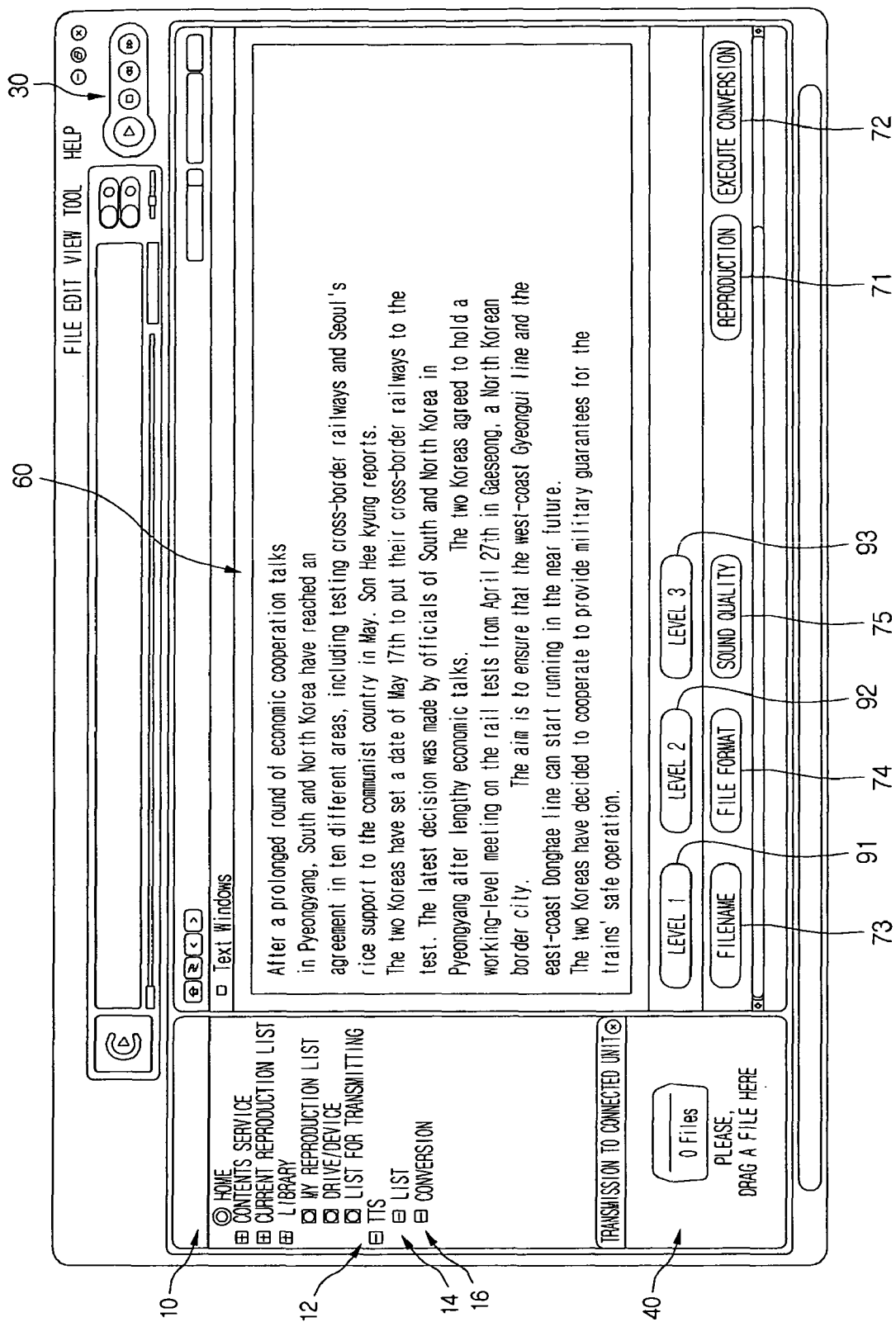

FIG. 11 illustrates an example of an interface screen displayed when the level conversion menu item 66 is selected. This is a mere example for easy understanding, and embodiments are not limited to the structure described herein. The selection of the level conversion menu item 66 is performed by the device manipulation unit 120. The control unit 210 generates and displays the interface screen of FIG. 11 on the image output unit 260 through the image processing unit 250. A script selected by the user is recorded on the text window 60. A reproduction menu item 71, a conversion execution menu item 72, a filename menu item 73, a file format menu item 74, and a sound quality menu item 75 are the same as those of FIG. 7.

Menu items 91, 92, and 93 for setting a level are included to generate a voice file according to a level set by a user. The menu items for setting the level described herein are mere examples for easy understanding. A user level can be a beginner, an intermediate level, or an advanced level depending on a foreign language ability. Generation of a voice file corresponding to the user level can be understood as generation of a voice file having a different reading speed depending on the user level. For example, in the case where the user level is classified into a level 1 to a level 3, the level 2 is set as a standard reading speed, the level 1 is set to output voice at a reading speed slower than the standard reading speed by a predetermined time, and the level 3 is set to voice at a reading speed faster than the standard reading speed by a predetermined time. Also, regarding a voice file corresponding to the user level, generation of the voice file can be controlled to generate the voice file allowing voices corresponding to reading once, repeated reading twice, or repeated reading three times to be output.

Figure 12:
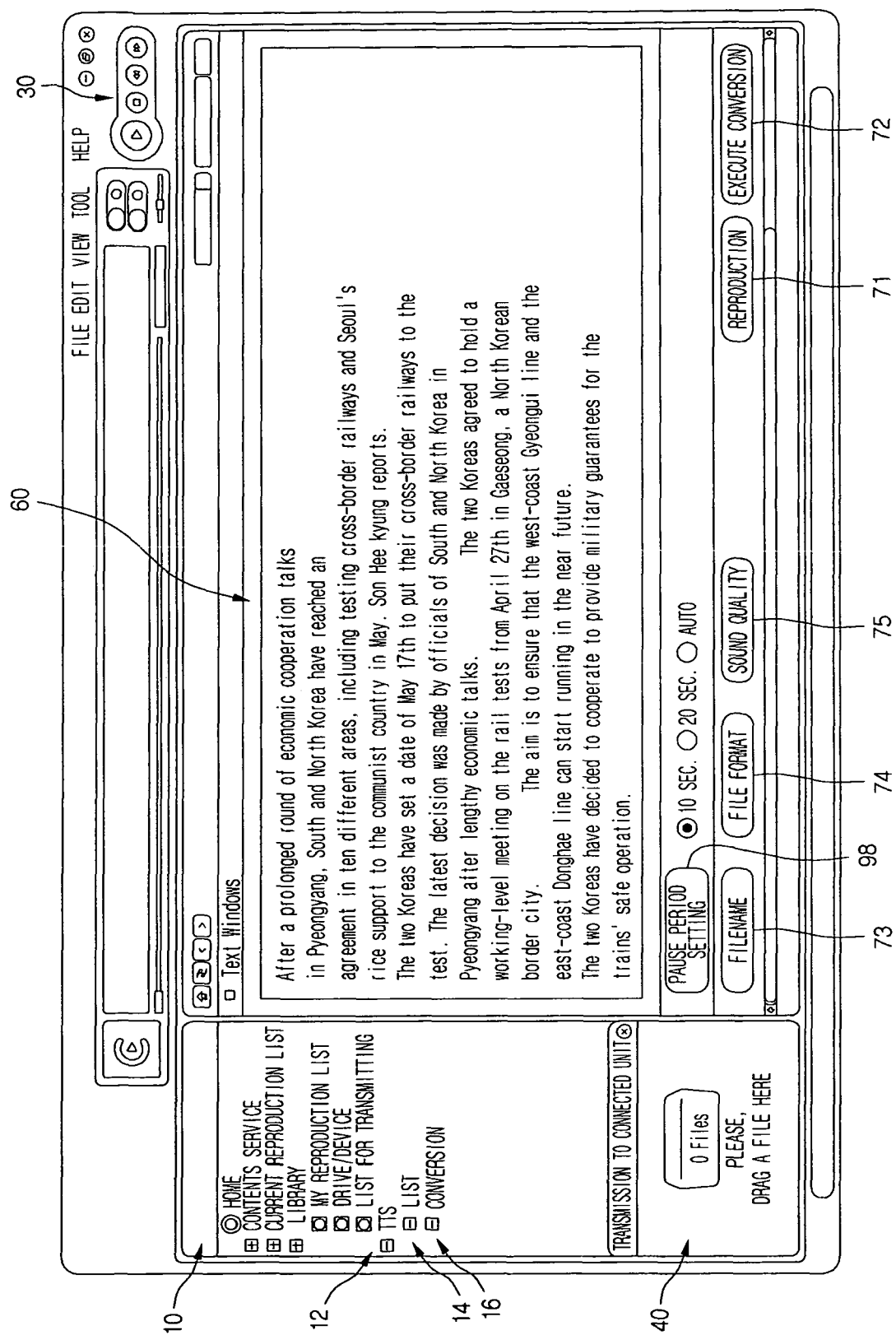

FIG. 12 illustrates an example of an interface screen displayed when the dictation conversion menu item 68 is selected. This is a mere example for easy understanding, and embodiments are not limited to the structure described herein. The selection of the dictation conversion menu item 68 is performed by the device manipulation unit 120. The control unit 210 generates and displays the interface screen of FIG. 12 on the image output unit 260 through the image processing unit 250. A script selected by the user is recorded on the text window 60. A reproduction menu item 71, a conversion execution menu item 72, a filename menu item 73, a file format menu item 74, and a sound quality menu item 75 are the same as those of FIG. 7. A menu item 98 for setting a pause is included upon dictation conversion. A pause can be set after a predetermined sentence is read and before the next sentence is read using the menu item 98 for setting the pause. A pause time value can be selected from a list, or input by a user in person. The pause time can be automatically set in proportion to the length of a sentence.

Figure 13:
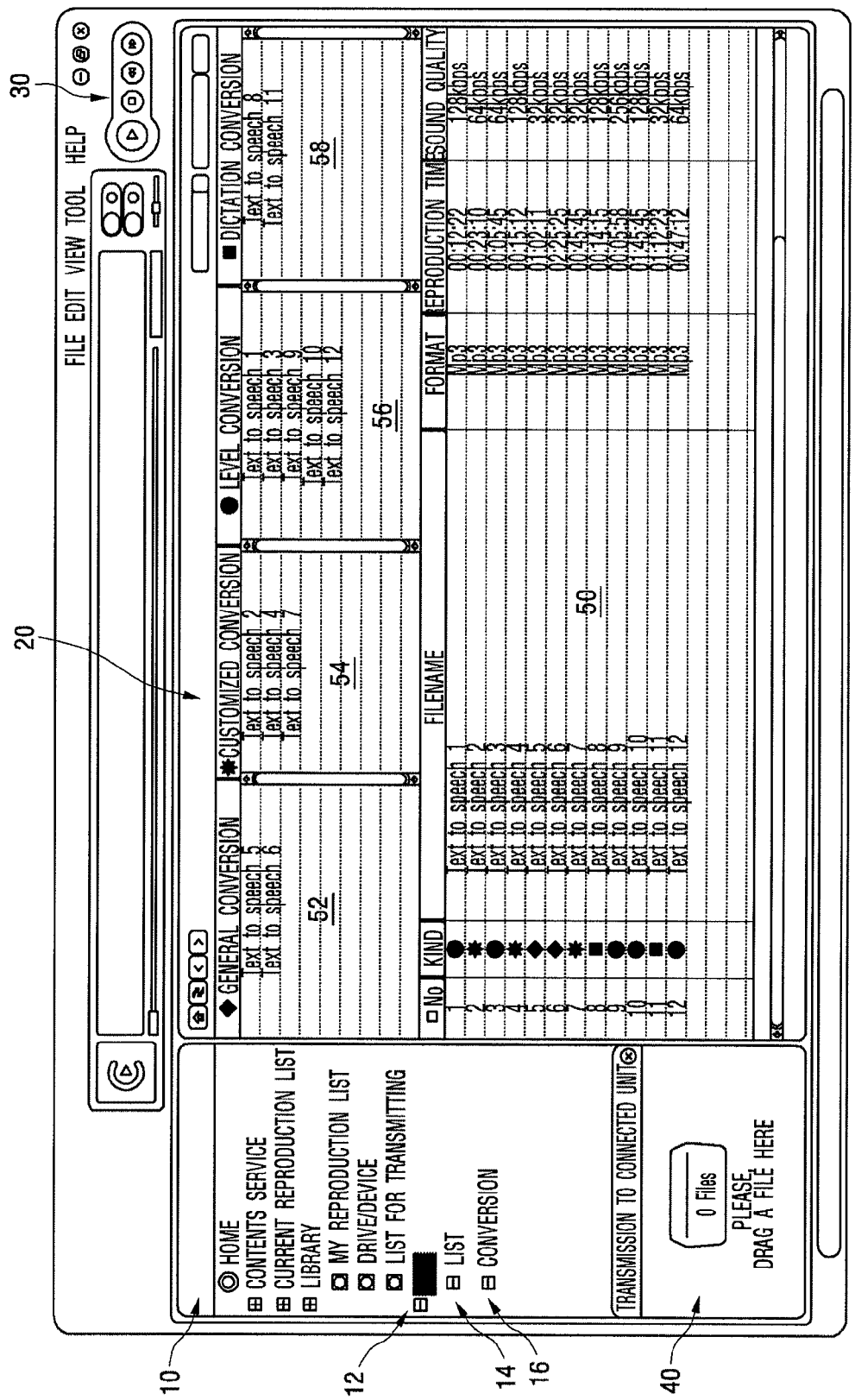

FIG. 13 illustrates an example of an interface screen displaying a list of stored voice files when the voice files are generated using the method described up to now. Twelve voice files are displayed together with No. of files, a kind, a filename, a format, a reproduction time, and sound quality on the file list window 50. According to an embodiment, since four kinds of conversion modes are provided, a general conversion list window 52, a customized conversion list window 54, a level conversion list window 56, and a dictation conversion list window 58 are displayed. The general conversion list window 52 displays a list of voice files generated by general conversion. The customized conversion list window 54 displays a list of voice files generated by customized conversion. The level conversion list window 56 displays a list of voice files generated by level conversion. The dictation conversion list window 58 displays a list of voice files generated by dictation conversion. The conversion mode by which a voice file has been generated can be expressed by a relevant icon. FIG. 13 illustrates icons corresponding to kinds of conversion are expressed in the 'kind' item.

Figure 14:
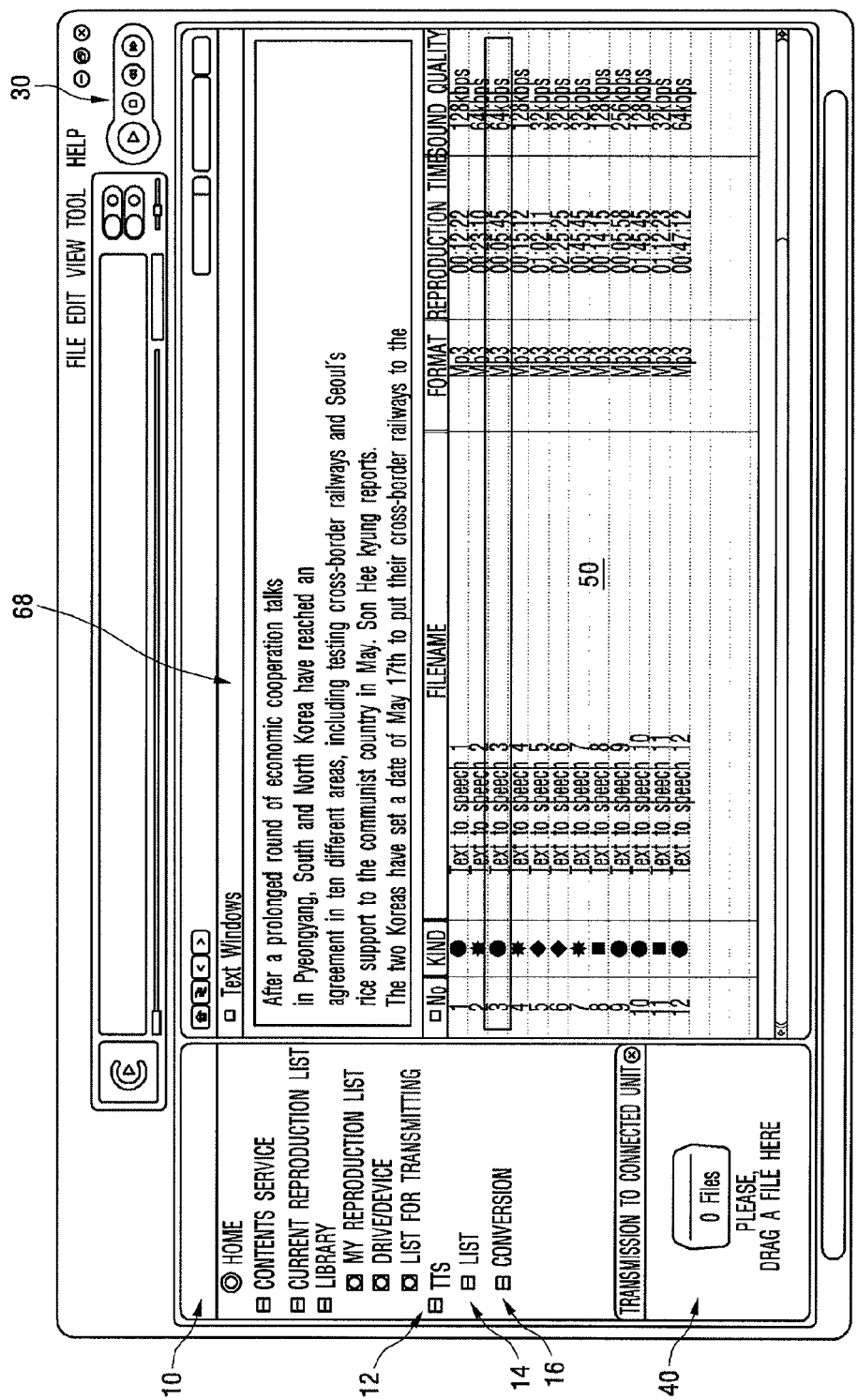

FIG. 14 illustrates an interface screen according to an embodiment of reproducing a voice file when one of voice files is selected from a list of the voice files. Here, a script corresponding to a voice file is displayed in synchronization with a script window. When a voice file is generated with respect to a selected script and the generated voice file is stored in a second storage 292, data connecting the voice file with a corresponding script is provided. A script is stored as one text file with respect to a corresponding script file. Also, text and a voice file may be stored as one content. Therefore, when a voice file is selected, a script connected with the selected voice file can be output in synchronization with the script window, and the voice file can be reproduced in synchronization with the script.

In FIG. 14, transmission of a predetermined voice file can be performed. Transmission of a voice file is performed by dragging the voice file onto the transmission control icon window 40. Alternatively, a separate transmission menu item can be provided. When the transmission menu item is selected, the selected voice file is transmitted to other unit connected to a device. Transmission of the voice file is performed through the communication unit 230 under control of the control unit 210.

All menu items of FIGS. 5 to 13 can be displayed on a single screen, for example, a screen structure illustrated in FIG. 4. That is, the structure of an interface screen to be displayed every operation, and items that can be included in the interface screen can be freely modified. Also, the order of displaying respective interface screens can be freely modified.

Embodiments convert a selected script into a voice file to generate new contents. The generated contents can be reproduced or transmitted. Embodiments provide a foundation where a variety of conversion conditions can be set upon generation of contents regarding a script, and the script can be converted into a voice file suitable for the conditions.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for processing a media interface by a device, the method comprising:
    displaying, by the device, a user interface screen including a text window on which a script to be converted into voice is written, and a conversion execution icon to be selected for converting the script written on the text window into voice, and menu icons for setting conversion conditions; and
    setting, by the device, a conversion condition on the script by dragging at least one of the menu icons and locating the dragged menu icon to a specific location on the script,
    wherein the step of locating the dragged menu icon comprises:
        locating at least one of a repeat start icon, a speed faster icon and a speed slower icon on a beginning of a section in the script, and
        locating at least one of a repeat end icon and an original speed icon on an ending of the section.

2. The method according to claim 1, wherein the conversion condition comprises at least one of a conversion without a condition, a conversion that includes a repeat of a section upon reproduction of voice, a conversion that includes a pause at a predetermined position, a conversion speed control, a conversion format, and a sound quality.

3. The method according to claim 1, wherein the conversion execution icon determines whether to convert the script written on the text window into voice.

4. The method according to claim 1, wherein the conversion execution icon determines whether to convert the script written on the text window into a voice file.

5. The method according to claim 1, further comprising:
    converting the script to a voice file if the conversion execution icon is selected; and
    reproducing the script if the conversion execution icon is not selected.

6. The method according to claim 1, wherein the step of locating further comprises:
    locating a pause icon on the specific position to be paused in the script, and
    the step of setting comprises setting a pause condition to the specific position for a specific interval.

7. The method according to claim 6, wherein the specific interval is automatically set in proportion to the length of a section in the script.

8. The method according to claim 1, wherein the step of setting comprises:
    setting the section to be repeated for predetermined times.

9. The method according to claim 1, wherein the step of setting comprises:
    setting the section to be read faster than speed on other sections.

10. A recording medium having a media interface application recorded thereon, the application being processed by a device using a method comprising:
    displaying, by the device, a user interface screen including a text window on which a script to be converted into voice is written, and a conversion execution icon to be selected for converting the script written on the text window into voice, and menu icons for setting conversion conditions; and
    setting, by the device, a conversion condition on the script by dragging at least one of the menu icons and locating the dragged menu icon to a specific location on the script,
    wherein the step of locating the dragged menu icon comprises:
        locating at least one of a repeat start icon, a speed faster icon and a speed slower icon on a beginning of a section in the script, and
        locating at least one of a repeat end icon and an original speed icon on an ending of the section.

11. The method according to claim 1, wherein the conversion condition the script comprises at least one of general conversion, customized conversion, level conversion, and dictation conversion.

12. The method according to claim 11, wherein the general conversion converts the script written on the text window into voice without a condition.

13. The method according to claim 11, wherein the customized conversion converts the script written on the text window into voice according to at least one condition set from whether to repeat a section upon reproduction of voice, whether to pause at a predetermined position, and a speed control.

14. The method according to claim 11, wherein the level conversion allows the script written on the text window to be reproduced at a different speed depending on a set level of a user.

15. The method according to claim 11, wherein the dictation conversion allows the script written on the text window to be reproduced with a pause by one sentence unit.

16. The method according to claim 1, wherein the conversion condition the script comprises at least one of a voice signal, a format, and sound quality.

17. An apparatus, comprising:
a display; and
a processor operatively connected to the display and configured to
  display a user interface screen including a text window on which a script to be converted into voice is written, and a conversion execution icon to be selected for converting the script written on the text window into voice, and menu icons for setting conversion conditions, and
  set a conversion condition on the script by dragging at least one of the menu icons and locating the dragged menu icon to a specific location on the script,
  wherein the processor is configured to locate the dragged menu icon by locating at least one of a repeat start icon, a speed faster icon and a speed slower icon on a beginning of a section in the script, and locating at least one of a repeat end icon and an original speed icon on an ending of the section.

* * * * *